United States Patent
Mason

(10) Patent No.: US 12,038,582 B2
(45) Date of Patent: Jul. 16, 2024

(54) WAVEGUIDE STRUCTURE FOR HEAD UP DISPLAYS

(71) Applicant: Snap Inc., Santa Monica, CA (US)

(72) Inventor: Stephen Paul Mason, Rochester Kent (GB)

(73) Assignee: Snap Inc., Santa Monica, CA (US)

(*) Notice: Subject to any disclaimer, the term of this patent is extended or adjusted under 35 U.S.C. 154(b) by 881 days.

(21) Appl. No.: 16/977,701

(22) PCT Filed: Mar. 5, 2019

(86) PCT No.: PCT/GB2019/050602
§ 371 (c)(1),
(2) Date: Sep. 2, 2020

(87) PCT Pub. No.: WO2019/171038
PCT Pub. Date: Sep. 12, 2019

(65) Prior Publication Data
US 2020/0393682 A1      Dec. 17, 2020

(30) Foreign Application Priority Data

Mar. 7, 2018 (EP) ..................................... 18275036
Mar. 7, 2018 (GB) ..................................... 1803642

(51) Int. Cl.
*G02B 27/01* (2006.01)
*F21V 8/00* (2006.01)

(52) U.S. Cl.
CPC ....... *G02B 27/0172* (2013.01); *G02B 6/0016* (2013.01); *G02B 6/0036* (2013.01); *G02B 6/005* (2013.01); *G02B 2027/0123* (2013.01)

(58) Field of Classification Search
CPC ... G02B 27/01–0189; G02B 2027/0105–0198; G02B 6/00–567
See application file for complete search history.

(56) References Cited

U.S. PATENT DOCUMENTS 7,907,342 B2    3/2011  Simmonds et al.
10,088,675 B1  10/2018  Brown et al.
(Continued)

FOREIGN PATENT DOCUMENTS

EP    3537201    9/2019
EP    3762763    1/2021
(Continued)

OTHER PUBLICATIONS

International Preliminary Report on Patentability received for PCT Application No. PCT/GB2019/050602. Dated Sep. 17, 2020. 9 pages.
(Continued)

*Primary Examiner* — Bao-Luan Q Le
*Assistant Examiner* — Christopher A Lamb, II
(74) *Attorney, Agent, or Firm* — Schwegman Lundberg & Woessner, P.A.

(57) ABSTRACT

An optical waveguide for a head up display having two optical input regions. Optical gratings direct light injected into the optical input regions towards and output region and to be trapped in the optical waveguide by total internal reflection. Beam splitters are provided to expand the pupil in two dimensions. Light from each input region is directed to different areas of the output region.

20 Claims, 4 Drawing Sheets

(56) References Cited

U.S. PATENT DOCUMENTS

| | | | |
|---|---|---|---|
| 2010/0246003 A1* | 9/2010 | Simmonds | G02B 27/0172 |
| | | | 359/567 |
| 2014/0218801 A1 | 8/2014 | Simmonds et al. | |
| 2017/0176747 A1* | 6/2017 | Vallius | G02B 6/3598 |
| 2017/0363871 A1 | 12/2017 | Vallius et al. | |
| 2018/0284440 A1* | 10/2018 | Popovich | G02B 27/0172 |

FOREIGN PATENT DOCUMENTS

| | | |
|---|---|---|
| GB | 2573611 | 11/2019 |
| GB | 2573611 B | 11/2022 |
| IN | 202017038212 | 10/2020 |
| KR | 20200126989 | 11/2020 |
| WO | 2004109349 A2 | 12/2004 |
| WO | 2007141606 A2 | 12/2007 |
| WO | 2015091277 A1 | 6/2015 |
| WO | 2016046514 A1 | 3/2016 |
| WO | 2017060665 A1 | 4/2017 |
| WO | 2019171038 A1 | 9/2019 |

OTHER PUBLICATIONS

"European Application Serial No. 19709551.6, Response to Communication pursuant to Rules 161(1) and 162 EPC filed Apr. 8, 2021", 20 pgs.

"Indian Application Serial No. 202017038212, First Examination Report dated Jul. 7, 2022", w/ English Translation, 6 pgs.

"United Kingdom Application Serial No. 1902928.9, Office Action dated Mar. 11, 2019", 2 pgs.

"United Kingdom Application Serial No. 1902928.9, Subsequent Examination Report under Section 18 (3) dated Aug. 18, 2022", 4 pgs.

International Search Report and Written Opinion received for PCT Application No. PCT/GB2019/050602. Dated Apr. 12, 2019. 15 pages.

GB Search Report under Section 17(5) received for GB Application No. 1803642.6 dated Aug. 30, 2018. 3 pages.

Combined Search and Examination Report under Sections 17 and 18(3) received for GB Application No. 1902928.9 dated Aug. 27, 2019. 6 pages.

Extended European Search Report received for EP Application No. 18275036.4 dated Oct. 5, 2018. 9 pages.

"European Application Serial No. 19709551.6, Communication Pursuant to Article 94(3) EPC dated Feb. 9, 2023", 6 pgs.

"United Kingdom Application Serial No. 1902928.9, Response filed Sep. 7, 2022 to Subsequent Examination Report under Section 18 (3) dated Aug. 18, 2022", 3 pgs.

"United Arab Emirates Application Serial No. P6001270 2020, Substantive Examination Report mailed Dec. 11, 2023", 8 pgs.

"Brazilian Application Serial No. 1120200180599, Office Action mailed Jan. 4, 2024", w/ English Machine Translation, 8 pgs.

"Korean Application Serial No. 10-2020-7026001, Notice of Preliminary Rejection mailed Mar. 25, 2024", w/ English translation, 14 pgs.

"Brazil Application Serial No. 1120200180599, Response filed Apr. 4, 2024 to Office Action mailed Jan. 4, 2024", w/ English Machine Translation, 66 pgs.

\* cited by examiner

WAVEGUIDE STRUCTURE FOR HEAD UP DISPLAYS

This disclosure relates to optical waveguides for head up displays and is particularly, but not exclusively, relevant to such optical waveguides having two input locations.

Head up displays utilise a transparent component, which the user looks through, to overlay an image on the user's actual view of the surroundings. The user's eye receives light from those surroundings in the normal way, and the user's eye also receives light from the head up display system. An image from the head up display is thus overlaid on the actual surroundings.

The transparent component of a head up display is typically mounted in a fixed position on equipment being used by a user (for example the cockpit of an aircraft), but may also be mounted on the head of the user (for example as a pair of spectacles, or on a helmet) such that the component moves with the user's head and thus remains at a fixed location in relation to the user's eye.

A fundamental requirement of a head up display is to couple light from an image source to the location required for viewing by the user, known as the exit pupil. This may be accomplished utilising a waveguide system as shown schematically in cross section in FIG. 1.

Image projection system 11, 12 projects an image into waveguide 10 which couples the image to a user's eye 1 positioned at the exit pupil of the system. Waveguide body 10 is optically transmissive such that the user views the real world through the waveguide and the image from the projection system 11, 12 is overlaid onto that view.

The projector optics 12 are arranged to distribute the projected image over an input region of the waveguide. The near-field at that region represents the spatial distribution of light across the projector optic's exit pupil, while the far field represents the image information (each pixel of the image is represented by a discrete ray angle). It is desirable for the image displayed to the user (i.e at the exit pupil) to be focussed a long way from the eye (infinity), since this is the likely focus distance of the real world image onto which the projected image is overlaid.

Input grating 13 couples the ray 14 into waveguide body 10. Input grating 13 may be a diffractive grating which diffracts ray 14 to an angle at which it is trapped within the waveguide 10 by total internal reflection. Output grating 15 diffracts light back to its original angles such that it exits the waveguide and propagates to an exit pupil positioned to coincide with the location of eye 1. The output grating 15 may also be a diffractive grating. Waveguide 10 and the input and output gratings 13, 15 are configured to preserve ray direction between the input and exit pupils to preserve image information. That is, the far field of the light at the exit pupil matches the far field at the input pupil.

For clarity in the figures a single ray 14 is shown, but as will be appreciated this is representative of rays at a range of angles. The input light is also spatially distributed and hence ray 14 also represents rays distributed over the input pupil.

To allow for flexibility in the alignment of the user's eye with the device, the exit pupil should be large enough to accommodate likely positions of the user's eye in use. The waveguide system may be designed to expand the input pupil such that the exit pupil is larger than the input pupil. This expansion is commonly known as pupil replication. The expansion should be performed while preserving the far field and maintaining a constant luminance across the near field.

This expansion may be achieved utilising both diffractive structures 15 and 16 in the waveguide 10. The expansion may be provided in either one dimension or two perpendicular dimensions, using techniques known in the art.

Gaps or irregular luminance between replicated pupils leads to non-uniformities in the output display, causing changes in perceived brightness in the far field and if the user's eye moves relative to the display. Providing expansion in two-dimensions without utilising an impractically sized waveguide can be challenging. Furthermore as the expansion ratio increases the luminance for each pupil decreases, thus reducing the perceived brightness for a given source brightness.

There is therefore a requirement for a waveguide to provide pupil expansion and a uniform display while maintaining suitable size and output brightness.

The embodiments described below are not limited to implementations which solve any or all of the disadvantages of known systems.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

There is provided an optical waveguide for a head up display, the optical waveguide being configured to provide pupil expansion in two dimensions and having an input end and an output end, the optical waveguide comprising first and second input regions positioned at the input end; first and second optical gratings configured to direct light received through the first and second input regions respectively such that the light propagates towards the output end of the optical waveguide and is trapped in the optical waveguide by total internal reflection, wherein the propagation direction has a lateral component relative to the direction from the input end to the output end; first and second beam splitters configured to expand the pupil of light propagating in the optical waveguide and received through the first and second input regions respectively, the expansion being in the direction of propagation through the first and second beam splitters; third and fourth optical gratings configured to direct light received from the first and second beam splitters respectively such that the light propagates in a direction substantially aligned with the direction from the input end to the output end; third and fourth beam splitters configured to expand the pupil of light propagating in the optical waveguide and received from the third and fourth optical gratings respectively, the expansion being in the direction of propagation through the third and fourth beam splitters; and an output grating configured to couple light propagating in the waveguide and received from the third and fourth beam splitters out of the waveguide. the first and second input regions are positioned to the left and right respectively of an axis from the input end to the output end of the optical waveguide, and the first and second input regions are substantially in a first plane, the first plane parallel to the direction of propagation and parallel to the pupil expansion direction.

Light received through the first input region may be coupled out of the waveguide by the output grating in a region predominantly to the right of the axis, and light received through the second input region is coupled out of the waveguide by the output grating in a region predominantly to the left of the axis.

The axis may be positioned at the centre of the output region in a lateral direction.

The optical waveguide according to any preceding claim further comprising first and second projectors to project light into the first and second input regions.

The light received in each of the first and second input regions may comprise light to form an image and the light represents the full field of view of the image.

The light received in each of the first and second input regions may comprise light to form part of the full field of view of the image and these two parts are combined by the waveguide to provide the full field of view.

The light received through the first and second input regions may cross within the optical waveguide in the region of the third and fourth optical gratings.

BRIEF DESCRIPTION OF THE DRAWINGS

Embodiments of the invention will be described, by way of example, with reference to the following drawings, in which.

DETAILED DESCRIPTION

Figure 1:
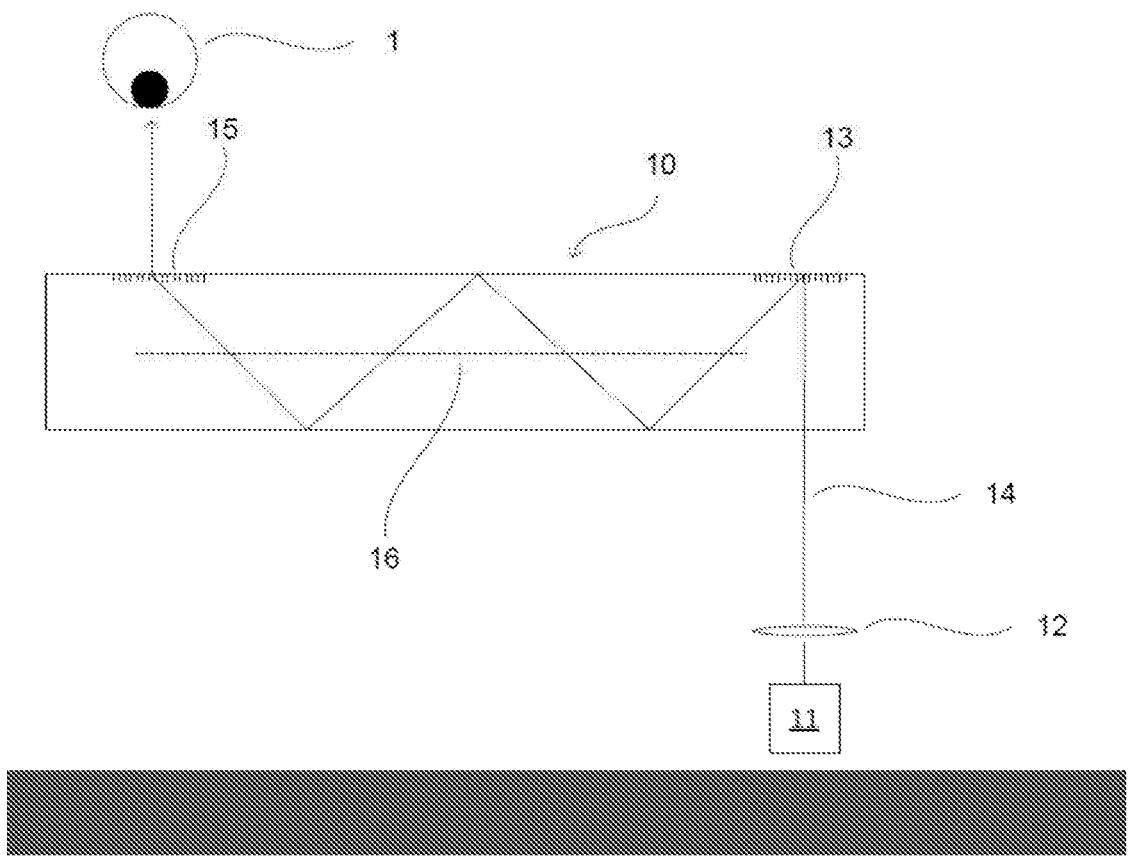
FIG. 1 shows a schematic diagram of selected components of a waveguide.

Further details, aspects and embodiments of the invention will now be described, by way of example only, with reference to the drawings. Elements in the figures are illustrated for simplicity and clarity and have not necessarily been drawn to scale. Like reference numerals have been included in the respective drawings to ease understanding.

Figure 2:
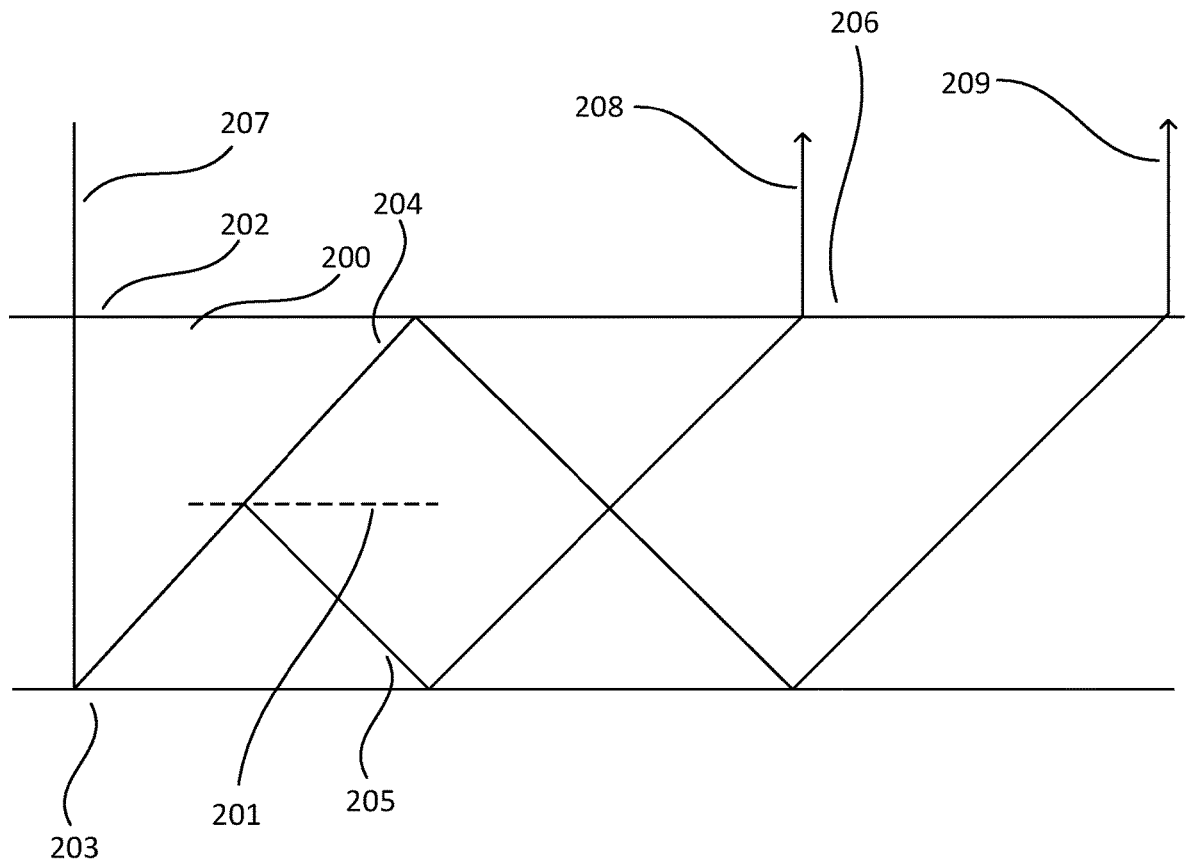
FIG. 2 shows a waveguide with a beam splitter.

FIG. 2 shows a schematic diagram of aspects of an optical waveguide 200 with a beam splitter 201. Light is injected at input region 202 and diffracted by an input diffraction grating 203 such that it is trapped by total internal reflection in the optical waveguide 200. The light ray strikes beam splitter 201, which partially transmits ray 204 and partially reflects light ray 205. Each of those rays continues to propagate in the waveguide until they are ejected from the waveguide by output grating 206. Beam splitter 201 thus replicates input ray 207 into two output rays 208, 209. Input ray 207 may represent an image projected into the input pupil of a waveguide, and thus the beam splitter arrangement achieves pupil replication or expansion in one dimension.

Figure 3:
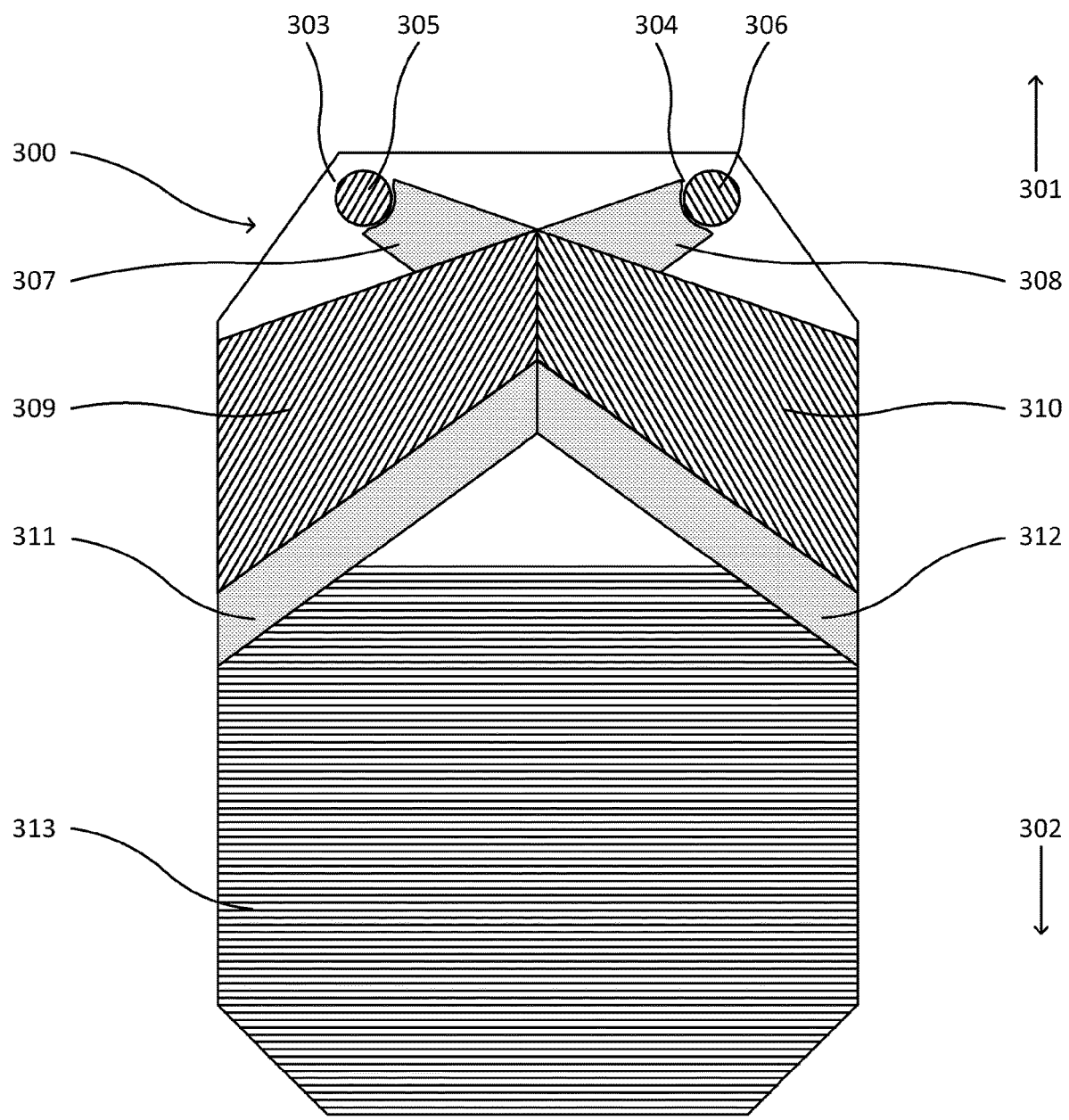
FIGS. 3 and 4 show schematic diagrams of selected components of a waveguide with two optical inputs.

FIG. 3 shows a plan view of an optical waveguide 300 for providing pupil expansion utilising both beam splitters and diffraction gratings in two dimensions. This is a compact design which may provide increased uniformity in the output image compared to other approaches using diffraction gratings alone. The waveguide 300 generally comprises an input end 301 and an output end 302. In use light is projected into defined regions at the input end, propagates within the waveguide 300, and is ejected from the waveguide at output end 302. Generally, injected light is for forming an image to be viewed by an eye positioned at the eye box corresponding to the output from the waveguide. To ease explanation the direction from the input end to the output end will be referred to as the length of the waveguide or longitudinal direction, and the direction perpendicular to the length, but in the plane of FIG. 3, will be described as the width of the device, or the lateral direction.

The waveguide 300 utilises two input locations 303, 304, each providing light to part of the device's output (but each providing the full field of view). In the example, each input illuminates half of the output, but unequal division may also be utilised if desirable for a particular application.

Each input 303, 304 comprises an input optical grating 305, 306. The input optical gratings may be fabricated on either face of the waveguide, or may be embedded within the optical waveguide 300 as is known in the art. In use light is projected into inputs 303, 304 to interact with input optical gratings 305, 306. The input light is redirected by the input optical gratings 305, 306 such that it propagates within the waveguide 300 at an angle which is trapped within the waveguide 300 by total internal reflection.

Light is projected into the inputs 303, 304 at an angle such that after interaction with the input gratings 305, 306 light propagates from the input end to the output, but that also comprises a lateral component such that the light also propagates across the width of the waveguide. For example, the input light may be injected to propagate at an angle of 60 degrees to the length of the waveguide.

Beam splitters 307, 308 are located in waveguide 300 such that light propagating from inputs 303, 304 interacts with the respective beam splitter 307, 308 which replicate the pupils in the direction of propagation, as explained in relation to FIG. 2 above.

Figure 4:
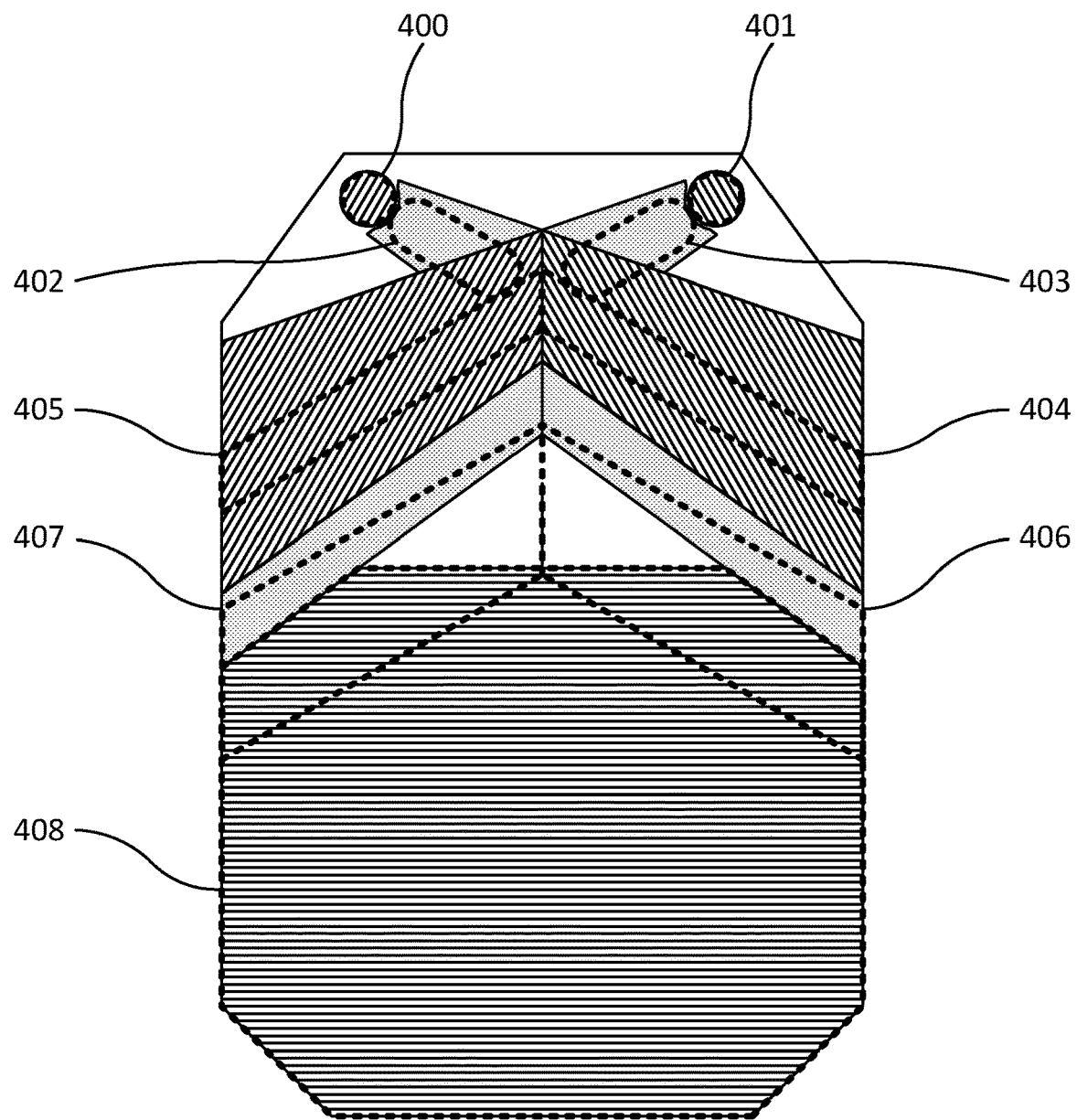

FIG. 4 shows the same waveguide with the addition of indicative pupil shapes to show the effect of each part of the device on the input pupil.

At the input the pupil is circular 400, 401 and the pupil is expanded to 402, 403 by the beam splitters 307, 308.

Gratings 309, 310 are provided such that the light propagating from the inputs 303, 304 interacts with a respective grating which is on the opposite lateral side of the waveguide. Gratings 309, 310 are configured to diffract the light towards the vertical direction (downwards in FIGS. 3 and 4) such that the propagation is more towards the output end of the device. Gratings 309, 310 are also weakly diffractive so that at each interaction with the light trapped within the waveguide some is diffracted towards the output end of the waveguide whilst the remainder continues in its original direction towards the wides of the waveguide. This acts to further expand the pupil from 402, 403 to 404, 405, together covering the full width of the waveguide.

After diffraction from the gratings 309, 310 the light propagates through beam splitters 311, 312 which replicates the pupils in the vertical direction from 405, 405 to 406, 407.

Light then enters output region 302 in which an output grating 313 diffracts light to an angle at which it is no longer trapped by total internal reflection and at which it propagates out of the device to the user's eye. The output grating is also weakly diffractive, providing pupil replication to further expand the pupil in the vertical direction from 406, 407 to 408.

The use of two inputs and two gratings to redirect light between beam splitters provides a compact optical system with pupil replication in two dimensions. The use of two gratings reduces the size of each single grating which may improve design flexibility and grating performance.

Two sets of collimation optics are required to inject light into each of the inputs, but this may offer a number of advantages over previous designs. A separate light source can be utilised for each input, thus increasing the available luminance.

In a first configuration, each input supports all of the field of view of the display, but it is also possible to project two partially overlapping images providing an increased brightness for each image.

The use of separate projection apparatuses for each input can also provide redundancy and hence improved reliability.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality. In the claims, the term 'comprising' or "including" does not exclude the presence of other elements.

The invention claimed is:

1. An optical waveguide for a head up display, the optical waveguide being configured to provide pupil expansion in two dimensions and having an input end and an output end, the optical waveguide comprising:
    first and second input regions positioned at the input end;
    first and second optical gratings configured to direct light received through the first and second input regions respectively such that the light propagates towards the output end of the optical waveguide and is trapped in the optical waveguide by total internal reflection, wherein the propagation direction has a lateral component relative to the direction from the input end to the output end;
    first and second beam splitters configured to expand the pupil of light propagating in the optical waveguide and received through the first and second input regions respectively, the expansion being in the direction of propagation through the first and second beam splitters;
    third and fourth optical gratings configured to direct light received from the first and second beam splitters respectively such that the light propagates in a direction substantially aligned with the direction from the input end to the output end;
    third and fourth beam splitters configured to expand the pupil of light propagating in the optical waveguide and received from the third and fourth optical gratings respectively, the expansion being in the direction of propagation through the third and fourth beam splitters; and
    an output grating configured to couple light propagating in the optical waveguide and received from the third and fourth beam splitters out of the optical waveguide;
    wherein the first and second input regions are positioned to the left and right respectively of an axis from the input end to the output end of the optical waveguide, and the first and second input regions are substantially in a first plane, the first plane parallel to the direction of propagation and parallel to the pupil expansion direction.

2. The optical waveguide according to claim 1, wherein light received through the first input region is coupled out of the optical waveguide by the output grating in a region predominantly to the right of the axis, and light received through the second input region is coupled out of the optical waveguide by the output grating in a region predominantly to the left of the axis.

3. The optical waveguide according to claim 1, wherein the axis is positioned at the centre of the output region in a lateral direction.

4. The optical waveguide according to claim 1, further comprising first and second projectors to project light into the first and second input regions.

5. The optical waveguide according to claim 4, wherein the light received in each of the first and second input regions comprises light to form an image and the light represents the full field of view of the image.

6. The optical waveguide according to claim 4, wherein the light received in each of the first and second input regions comprises light to form part of the full field of view of the image and these two parts are combined by the optical waveguide to provide the full field of view.

7. The optical waveguide according to claim 1, wherein light received through the first and second input regions crosses within the optical waveguide in the region of the third and fourth optical gratings.

8. The optical waveguide according to claim 1 wherein the light received at the first input region illuminates a first portion of the output, and the light received at the second input region illuminates a second portion of the output.

9. The optical waveguide according to claim 8 wherein the first portion is equal to the second portion of the output.

10. The optical waveguide according to claim 8 wherein the first portion and the second portion are unequal.

11. The optical waveguide according to claim 1 wherein the light received at the first input region illuminates a first portion of the output, and the light received at the second input region illuminates a second portion of the output.

12. The optical waveguide according to claim 11 wherein the first portion is equal to the second portion of the output.

13. The optical waveguide according to claim 11 wherein the first portion and the second portion are unequal.

14. An optical waveguide having an input end and an output end, the optical waveguide comprising:
    first and second input regions positioned at the input end of the optical waveguide and comprising first and second optical gratings respectively, the first and second optical gratings configured to direct light incident on the first and second input regions into the optical waveguide such that the light propagates towards the output end of the optical waveguide;
    first and second beam splitters configured to expand the pupil of light propagating from the first and second optical gratings respectively, the expansion being in the direction of propagation through the first and second beam splitters;
    third and fourth optical gratings configured to direct light received from the first and second beam splitters respectively;
    third and fourth beam splitters configured to expand the pupil of light propagating in the optical waveguide and received from the third and fourth optical gratings respectively, the expansion being in the direction of propagation through the third and fourth beam splitters; and an output grating configured to couple light propagating in the optical waveguide and received from the third and fourth beam splitters out of the optical waveguide.

15. The optical waveguide according to claim 14, wherein the first and second input regions are positioned to the left and right respectively of an axis from the input end to the output end of the optical waveguide, and wherein light received through the first input region is coupled out of the optical waveguide by the output grating in a region predominantly to the right of the axis, and light received through the second input region is coupled out of the optical waveguide by the output grating in a region predominantly to the left of the axis.

16. The optical waveguide according to claim 14, wherein the axis is positioned at the centre of the output region in a lateral direction.

17. The optical waveguide according to claim 14, further comprising first and second projectors to project light toward the first and second input regions.

18. A head up display system comprising the optical waveguide according to claim 14.

19. An optical waveguide having an input end and an output end, the optical waveguide comprising:
 first and second input regions positioned at the input end of the optical waveguide and comprising first and second optical gratings respectively, the first and second optical gratings configured to direct light incident on the first and second input regions into the optical waveguide such that the light propagates towards the output end of the optical waveguide;
 first and second beam splitters configured to expand the pupil of light propagating from the first and second optical gratings respectively, the expansion being in the direction of propagation through the first and second beam splitters;
 third and fourth optical gratings configured to direct light received from the first and second beam splitters respectively, wherein light received at the first and second input regions crosses within the optical waveguide in the region of the third and fourth optical gratings;
 third and fourth beam splitters configured to expand the pupil of light propagating in the optical waveguide and received from the third and fourth optical gratings respectively, the expansion being in the direction of propagation through the third and fourth beam splitters; and
 an output grating configured to couple light propagating in the optical waveguide and received from the third and fourth beam splitters out of the optical waveguide.

20. A head up display system comprising the optical waveguide according to claim 19.

* * * * *